United States Patent
Dubey et al.

(10) Patent No.: US 9,177,043 B2
(45) Date of Patent: *Nov. 3, 2015

(54) MANAGEMENT OF DATA SEGMENTS FOR ANALYTICS QUERIES

(71) Applicant: LinkedIn Corporation, Mountain View, CA (US)

(72) Inventors: Sanjay Dubey, San Jose, CA (US); Dhaval Patel, San Jose, CA (US); Praveen N. Naga, Union City, CA (US); Volodymyr Zhabiuk, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/157,432

(22) Filed: Jan. 16, 2014

(65) Prior Publication Data

US 2015/0039574 A1 Feb. 5, 2015

Related U.S. Application Data

(63) Continuation of application No. 13/956,210, filed on Jul. 31, 2013, now Pat. No. 8,688,718.

(51) Int. Cl.
*G06F 17/30* (2006.01)

(52) U.S. Cl.
CPC ........ *G06F 17/30622* (2013.01); *G06F 17/30* (2013.01)

(58) Field of Classification Search
CPC .................. G06F 17/30622; G06F 17/30336; G06F 17/30321; G06F 17/30011
USPC .................................................. 707/752, 742
See application file for complete search history.

(56) References Cited

U.S. PATENT DOCUMENTS

| | | | |
|---|---|---|---|
| 6,675,159 B1 | 1/2004 | Lin et al. | |
| 7,870,114 B2 | 1/2011 | Zhang et al. | |
| 7,991,800 B2 | 8/2011 | Lawrence et al. | |
| 2011/0010347 A1* | 1/2011 | Cheriton et al. | 707/692 |

* cited by examiner

*Primary Examiner* — Monica Pyo
(74) *Attorney, Agent, or Firm* — Park, Vaughan, Fleming & Dowler LLP

(57) ABSTRACT

The disclosed embodiments provide a method and system for processing data. During operation, the system obtains a set of records, wherein each of the records comprises one or more metrics and at least one dimension associated with the one or more metrics. Next, the system creates a data segment comprising at least one of a forward index and an inverted index for a column in the records. The system then stores the data segment in network-accessible storage and assigns the data segment to a partition. Finally, the system enables querying of the data segment through a query node associated with the partition.

20 Claims, 10 Drawing Sheets

MANAGEMENT OF DATA SEGMENTS FOR ANALYTICS QUERIES

RELATED CASE

This application is a continuation application of, and hereby claims priority under 35 U.S.C. §120 to, pending U.S. patent application Ser. No. 13/956,210, by inventors Sanjay Dubey, Dhaval Patel, Praveen N. Naga and Volodymyr Zhabiuk, entitled "Management of Data Segments for Analytics Queries," filed on 31 Jul. 2013 Ser. No. 13/956,210.

RELATED APPLICATION

The subject matter of this application is related to the subject matter in a co-pending non-provisional application inventors Praveen N. Naga, Sanjay S. Dubey, Dhaval H. Patel and Volodymyr Zhabiuk and filed on the same day as the instant application, entitled "Indexing of Data Segments to Facilitate Analytics," having serial number TO BE ASSIGNED, and filed on 31 Jul. 2013 Ser. No. 13/956,184.

The subject matter of this application is also related to the subject matter in a co-pending non-provisional application by inventors Praveen N. Naga, Dhaval Patel, Sanjay Dubey and Volodymyr Zhabiuk and filed on the same day as the instant application, entitled "Real-Time Indexing of Data for Analytics," having serial number TO BE ASSIGNED, and filed on 31 Jul. 2013 Ser. No. 13/956,196.

The subject matter of this application is also related to the subject matter in a co-pending non-provisional application by inventors Dhaval Patel, Sanjay Dubey, Praveen N. Naga, Volodymyr Zhabiuk and Jintae Jung and filed on the same day as the instant application, entitled "Inverted Indexes for Accelerating Analytics Queries," having serial number TO BE ASSIGNED, and filed on 31 Jul. 2013 Ser. No. 13/956,223.

BACKGROUND

1. Field

The disclosed embodiments relate to data analysis. More specifically, the disclosed embodiments relate to techniques for managing data segments for analytics queries.

2. Related Art

Analytics may be used to discover trends, patterns, relationships, and/or other attributes related to large sets of complex, interconnected, and/or multidimensional data. In turn, the discovered information may be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms may be unable to handle petabytes or exabytes of loosely structured data that is generated on a daily and/or continuous basis from multiple, heterogeneous sources. Instead, management and processing of "big data" may require massively parallel software running on a large number of physical servers. In addition, big data analytics may be associated with a tradeoff between performance and memory consumption, in which compressed data takes up less storage space but is associated with greater latency and uncompressed data occupies more memory but can be analyzed and/or queried more quickly.

Consequently, big data analytics may be facilitated by mechanisms for efficiently and/or effectively collecting, storing, managing, compressing, transferring, sharing, analyzing, and/or visualizing large data sets.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
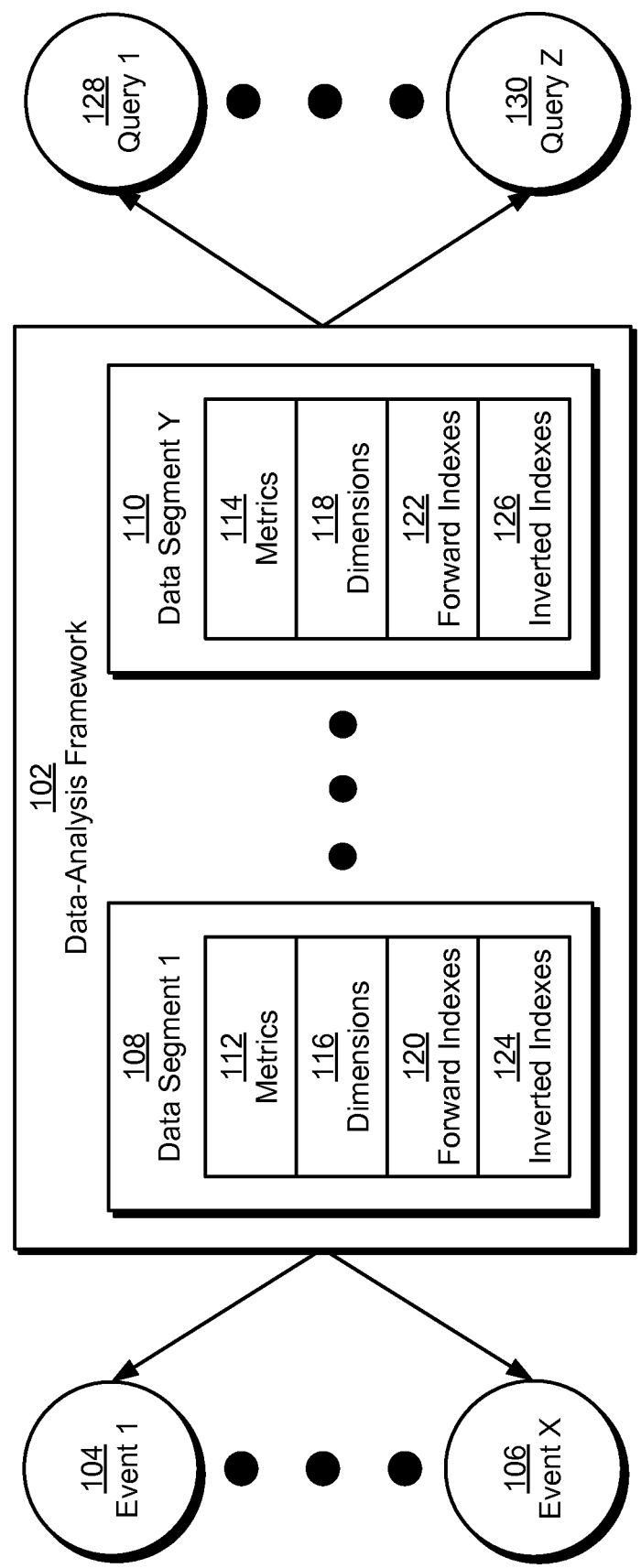
FIG. 1 shows a schematic of a system in accordance with the disclosed embodiments.

The disclosed embodiments provide a method and system for processing data. As shown in FIG. 1, the system may correspond to a data-analysis framework 102 that collects data associated with a set of events (e.g., event 1 104, event x 106) and generates a set of data segments (e.g., data segment 1 108, data segment y 110) from the data. For example, data-analysis framework 102 may generate data segments from records of events related to use of a website, purchase of goods or services, collection of sensor data, and/or interaction among users.

In particular, data-analysis framework 102 may include data in the data segments as semi-structured data containing one or more metrics 112-114 and one or more dimensions 116-118 associated with metrics 112-114. For example, business data in the data segments may include metrics associated with revenue, spending, click-through rates, conversions, duration of use, and/or other measurements of business performance. In turn, dimensions associated with the metrics may include information describing the entities (e.g., users, organizations, etc.) from which the metrics are obtained, such as the entities' types, locations, sizes, industries, skills, titles, and/or levels of experience.

In one or more embodiments, metrics 112-114 and dimensions 116-118 are associated with user activity at an online professional network. The online professional network may allow users to establish and maintain professional connections, list work and community experience, endorse and/or recommend one another, and/or search and apply for jobs. Employers may list jobs, search for potential candidates, and/or provide business-related updates to users. As a result, metrics 112-114 may track values such as dollar amounts spent, impressions of ads or job postings, clicks on ads or job postings, profile views, messages, and/or job or ad conversions within the online professional network. In turn, dimensions 116-118 may describe attributes of the users and/or events from which metrics 112-114 are obtained. For example, dimensions 116-118 may include the users' industries, titles, seniority levels, employers, skills, and/or locations. Dimensions 116-118 may also include identifiers for the ads, jobs, profiles, and/or employers associated with content viewed and/or transmitted in the events. Metrics 112-114 and dimensions 116-118 may thus facilitate understanding and use of the online professional network by advertisers, employers, and/or other customers of the online professional network.

Data-analysis framework 102 may then provide the data segments for use with queries (e.g., query 1 128, query z 130) associated with the data. For example, data-analysis framework 102 may enable analytics queries that are used to discover relationships, patterns, and/or trends in the data; gain insights from the data; and/or guide decisions and/or actions related to metrics 112-114 and/or dimensions 116-118. In other words, data-analysis framework 102 may include functionality to support the collection, storage, processing, and/or querying of big data.

In one or more embodiments, data-analysis framework 102 supports big data analytics through techniques for compressing, indexing, generating, and/or managing the data segments. First, data-analysis framework 102 may facilitate timely updates to the data by generating both real-time and offline data segments from records of the events, as described below with respect to FIG. 2. Next, data-analysis framework 102 may use a set of partitions, a set of query nodes, and/or a messaging service to enable querying of the data segments, as described below with respect to FIG. 3. Data-analysis framework 102 may further compress and/or aggregate records in the data segments using forward indexes 120-122 for columns in the data segments, as described below with respect to FIG. 4. Finally, data-analysis framework 102 may accelerate analytics queries (e.g., query 1 128, query z 130) using inverted indexes 124-126 in the data segments, as described below with respect to FIG. 5.

Figure 2:
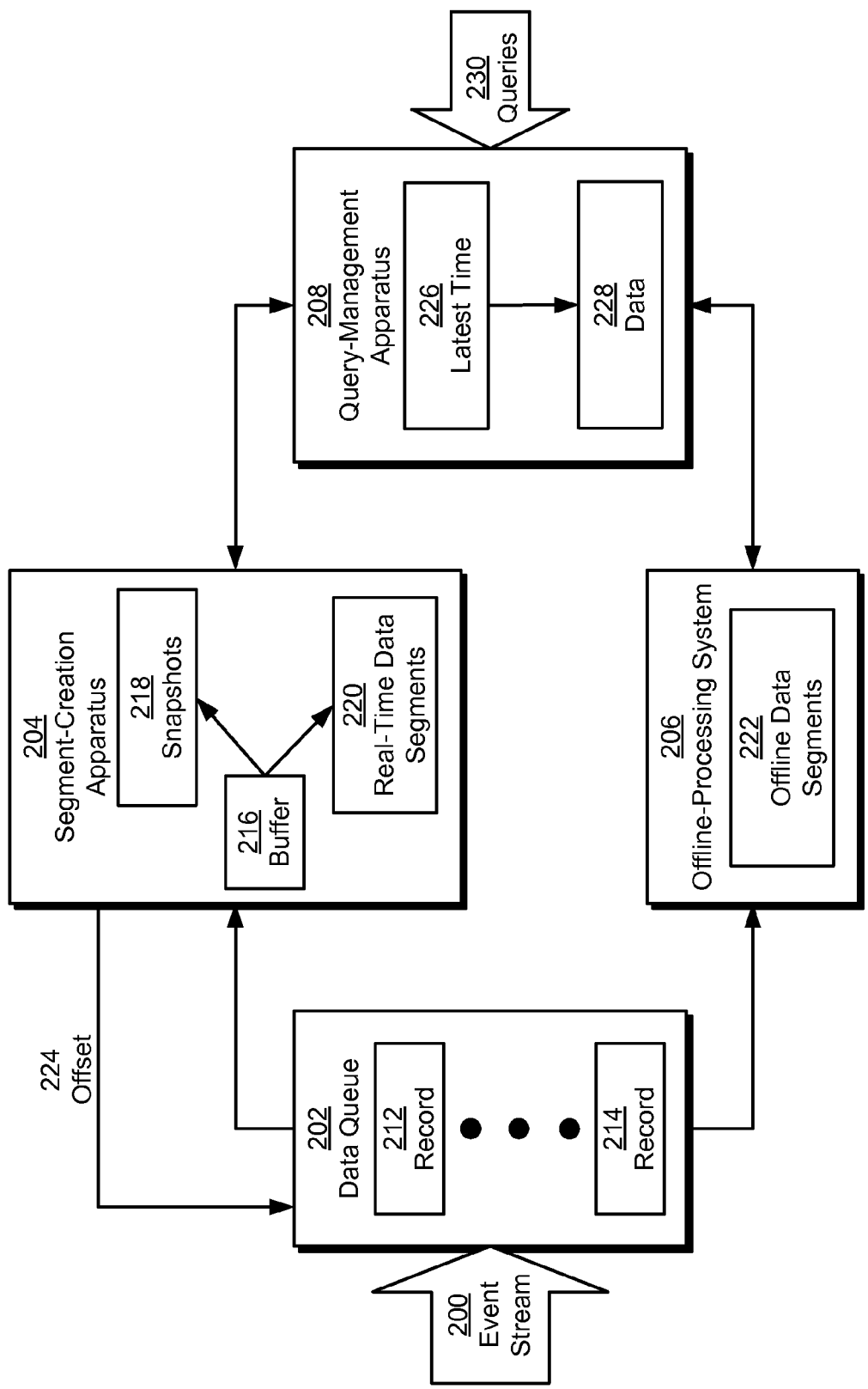
FIG. 2 shows a system for processing data in accordance with the disclosed embodiments.

FIG. 2 shows a system for processing data in accordance with the disclosed embodiments. As mentioned above, the system may provide a data-analysis framework (e.g., data-analysis framework 102 of FIG. 1) for enabling analytics of large, continuously updated data sets. As shown in FIG. 2, the system includes a data queue 202, a segment-creation apparatus 204, an offline-processing system 206, and a query-management apparatus 208. Each of these components is described in further detail below.

Data queue 202 may be used to aggregate records 212-214 of events from an event stream 200. For example, data queue 202 may receive records 212-214 of page views, clicks, and/or other user actions associated with a website as the user actions are detected. As a result, data queue 202 may receive thousands of records 212-214 from event stream 200 every second. In addition, events in event stream 200 may be obtained from multiple sources. For example, records 212-214 of events associated with use of a website may be received from a number of servers and/or data centers hosting the website.

After records 212-214 are received in data queue 202, records 212-214 may be "decorated" with additional data for use in subsequent analysis and/or querying of records 212-214. For example, each record 212-214 received from event stream 200 may include an identifier for a user participating in the corresponding event. Data queue 202 and/or another decoration mechanism may use the identifier to obtain additional (e.g., demographic) information for the user from a user repository (not shown) and update the record with the additional information.

Next, records 212-214 may be included in a set of data segments to enable the processing of queries 230 (e.g., analytics queries) related to records 212-214. More specifically, segment-creation apparatus 204 may generate real-time data segments 220 from records 212-214 as the records are received in data queue 202. As a result, segment-creation apparatus 204 may allow queries 230 on records 212-214 to be made in real-time and/or near real-time (e.g., with a delay of a few seconds). To further facilitate processing and/or querying of records 212-214, multiple instances of segment-creation apparatus 204 may be used to create real-time data segments 220 from different types of records and/or records from different sources.

On the other hand, offline-processing system 206 may generate offline data segments 222 from older records in data queue 202 independently of the generation of real-time data segments 220 in segment-creation apparatus 204. For example, offline-processing system 206 may generate offline data segments 222 from larger sets of records 212-214 to increase the amount of compression in offline data segments 222. Offline-processing system 206 may also regenerate one or more offline data segments 222 if the offline data segment(s) are lost and/or corrupted. The operation of offline-processing system 206 is discussed in further detail below with respect to FIG. 3.

To generate real-time data segments 220, segment-creation apparatus 204 may receive records 212-214 in a buffer 216 as records 212-214 are generated in data queue 202. After buffer 216 reaches a threshold size, segment-creation apparatus 204 may create a real-time data segment from the records in the buffer. For example, segment-creation apparatus 204 may create a real-time data segment after buffer 216 contains one million records. During creation of the real-time data segment, segment-creation apparatus 204 may include one or more forward indexes and/or inverted indexes in the real-time data segment. As discussed in further detail below with respect to FIGS. 4-5, the forward indexes may facilitate aggregation and/or compression of the real-time data segment, and the inverted indexes may accelerate queries 230 of records in the real-time data segment.

After the real-time data segment is created, segment-creation apparatus 204 may report an offset 224 of the real-time data segment to data queue 202. Offset 224 may serve as a "checkpoint" for records associated with the most recently created real-time data segment. If segment-creation apparatus 204 experiences a failure before the next real-time data segment is created, segment-creation apparatus 204 may request records after the most recently reported offset 224 from data queue 202 and reattempt to create the real-time data segment from the requested records.

Those skilled in the art will appreciate that buffer 216 may take a relatively large amount of time to reach the threshold size if events associated with records 212-214 occur infrequently. In turn, the lack of availability of up-to-date data for queries 230 may increase the latency associated with analyzing the data.

To enable real-time or near real-time querying of records prior to the creation of a real-time data segment, segment-creation apparatus 204 may periodically create snapshots 218 of records in buffer 216 and enable querying of snapshots 218. Snapshots 218 may be created according to a refresh frequency associated with querying of the records. For example, segment-creation apparatus 204 may create an uncompressed snapshot of complete records in buffer 216 after each interval of 2, 3 or 5 seconds has passed. Segment-creation apparatus 204 may then provide the snapshot, earlier snapshots, and real-time data segments 220 for use in query processing by query-management apparatus 208. For example, segment-creation apparatus 204 may provide an interface for querying real-time data segments 220 and/or snapshots 218 to query-management apparatus 208 and/or other components of the system of FIG. 2. Segment-creation apparatus 204 may then discard snapshots 218 after a real-time data segment containing the records in snapshots 218 is created.

Query-management apparatus 208 may enable real-time analytics by allowing queries 230 to be performed across snapshots 218, real-time data segments 220, and offline data segments 222. To allow querying of snapshots 218, real-time data segments 220, and/or offline data segments 222, query-management apparatus 208 may obtain a latest time 226 associated with available records in offline data segments 222 from offline-processing system 206. Next, query-management apparatus 208 may provide data 228 associated with a query by performing the query with offline data segments 222 up to latest time 226 and performing the query with real-time data segments 220 and/or snapshots 218 for records occurring after latest time 226.

For example, if offline-processing system 206 reports the availability of records in offline data segments 222 up to the previous day, query-management apparatus 208 may retrieve data 228 associated with a query up to the previous day from offline data segments 222. Query-management apparatus 208 may then update data 228 with records after the previous day from real-time data segments 220 and/or snapshots 218, even if real-time data segments 220 contain records occurring before the previous day.

As mentioned above, segment-creation apparatus 204 may recover from a loss of data during creation of a real-time data segment by retrieving the data from data queue 202 and using the data to recreate the real-time data segment. Along the same lines, the independent creation and use of real-time data segments 220 and offline data segments 222 may facilitate management of faults and failures associated with processing records 212-214 in data queue 202. For example, a fault and/or failure in segment-creation apparatus 204 may be managed by temporarily disabling the creation of real-time data segments 220 and continuing with the creation and querying of offline data segments 222. Queries 230 may then be handled by notifying the users from which queries 230 are received that queries 230 may return data that is older and not in real-time. Consequently, the system of FIG. 2 may mitigate the fault and/or failure by operating in a "degraded" mode that still allows for querying of most records instead of ceasing to process queries 230 completely. In turn, the "degraded" mode may provide more time to resolve the fault and/or failure than if the fault and/or failure prevented querying of any records.

Figure 3:
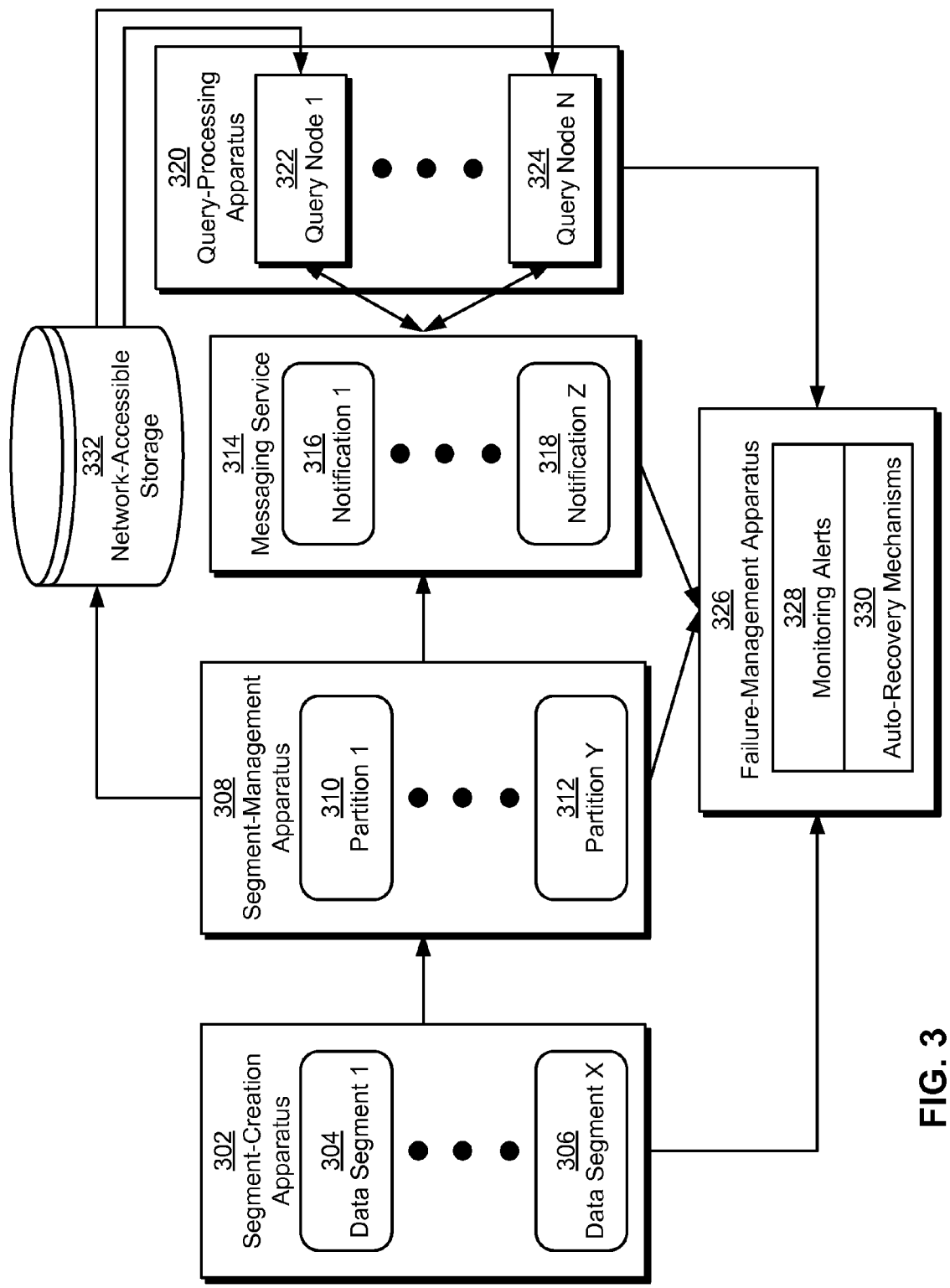
FIG. 3 shows an offline-processing system for data segments in accordance with the disclosed embodiments.

FIG. 3 shows an offline-processing system for data segments (e.g., offline-processing system 206 of FIG. 2) in accordance with the disclosed embodiments. As mentioned above, the offline-processing system may generate offline data segments (e.g., data segment 1 304, data segment x 306) from older records in a data queue, such as data queue 202 of FIG. 2. For example, the offline-processing system may use batch processing to generate data segments from the older records on a daily basis.

As with the system of FIG. 2, the system of FIG. 3 includes a segment-creation apparatus 302 that creates the data segments from the records and includes forward indexes and/or inverted indexes in the data segments. However, the data segments created by segment-creation apparatus 302 may include larger numbers of records than the real-time data segments created by segment-creation apparatus 204 of FIG. 2. For example, each data segment created by segment-creation apparatus 302 may include 10 million records instead of one million records. In addition, records may be collapsed within data segments created by segment-creation apparatus 302 to achieve greater compression than in the real-time data segments. For example, segment-creation apparatus 302 may collapse 10 impression records for the same event into a single impression record with an impression count of 10.

After a data segment is created by segment-creation apparatus 302, a segment-management apparatus 308 may store the data segment in network-accessible storage 332 such as network-attached storage (NAS) and/or one or more file servers. For example, segment-management apparatus 308 may upload the data segment to a temporary directory in network-accessible storage 332. Next, segment-management apparatus 308 may assign the data segment to a partition (e.g., partition 1 310, partition y 312). For example, segment-management apparatus 308 may compute a hash from an identifier for the data segment and perform a modulo operation on the hash using a modulus of the number of partitions to obtain an identifier for the partition to which the data segment is assigned.

Segment-management apparatus 308 may then use a messaging service 314 to provide a notification (e.g., notification 1 316, notification z 318) of the data segment to a query node (e.g., query node 1 322, query node n 324) within a query-processing apparatus 320, and the query node may use the notification to transfer the data segment from network-accessible storage 332 to the query node. For example, segment-management apparatus 308 may update messaging service 314 with an assignment of the data segment to the partition and a path and/or Uniform Resource Locator (URL) of the data segment in network-accessible storage 332. A query node associated with (e.g., responsible for) the partition may subscribe to and/or listen for notifications associated with the partition and receive a notification of the assignment of the data segment to the partition from messaging service 314. The query node may also use the path and/or URL in the notification to download the data segment from network-accessible storage 332. After the data segment is transferred to the query node, the data segment may be available for querying through the query node.

Segment-management apparatus 308 may also identify the data segment as a replacement for a previous version of the data segment in the partition. For example, the data segment may be generated by segment-creation apparatus 302 as a replacement for the previous version if the previous version contains corrupt data and/or is missing data. After storing the data segment in network-accessible storage 332, segment-management apparatus 308 may check messaging service 314 for information related to the previous version of the data segment. If the previous version exists, segment-management apparatus 308 may retrieve and override a notification of the previous version at messaging service 314 with a new notification of the replacement. The query node may obtain the new notification from messaging service 314 and use the new notification to replace the previous version with the data segment.

Querying of the data segment through the query node may subsequently be disabled after the data segment expires. For example, the data segment may be associated with a period of validity and/or time to live (TTL) that is based on the type of data in the data segment. After the period and/or TTL has elapsed, segment-management apparatus 308 may update messaging service 314 with a notification of the expiration of the data segment, and the corresponding query node may use the notification to delete the data segment and/or otherwise disable querying of the data segment.

Finally, a failure-management apparatus 326 may include functionality to detect and manage failures associated with the availability of data segments for querying through query nodes. The failures may be associated with obtaining the data segments from segment-creation apparatus 302, storing the data segments in network-accessible storage 332, communication with messaging service 314 by segment-management apparatus 308 and/or the query nodes, and/or transfer of the data segments to the query nodes. To manage the failures, failure-management apparatus 326 may generate monitoring alerts 328 that notify administrators and/or other users of the failures. For example, failure-management apparatus 326 may generate emails and/or other messages to the administrators and/or other users upon detecting a communication failure among segment-creation apparatus 302, segment-management apparatus 308, messaging service 314, and/or query-processing apparatus 320 and/or a failure to store data segments in network-accessible storage 332.

Failure-management apparatus 326 may also attempt to resolve the failures using one or more auto-recovery mechanisms 330. For example, failure-management apparatus 326 may manage a failure to transfer a data segment from network-accessible storage 332 to a query node by retrying the transfer and triggering a monitoring alert if the retry fails. Similarly, failure-management apparatus 326 may attempt to recover from the transmission of a data segment with corrupt data and/or data loss by initiating the creation of a replacement data segment in segment-creation apparatus 302 and the subsequent transfer of the replacement to segment-management apparatus 308, network-accessible storage 332, and the corresponding query node.

Those skilled in the art will appreciate that the system of FIG. 3 may be implemented in a variety of ways. As shown in FIG. 3, multiple query nodes may be provided by query-processing apparatus 320 to facilitate processing of queries across a large data set. Similarly, multiple instances of segment-management apparatus 308 may execute to increase fault tolerance, with communication between segment-creation apparatus 302 and the instances of segment-management apparatus 308 occurring over a virtual Internet Protocol (IP) address (VIP).

In addition, failure-management apparatus 326 may be implemented within and/or separately from segment-creation apparatus 302, segment-management apparatus 308, messaging service 314, and/or query-processing apparatus 320. For example, monitoring alerts 328 and/or auto-recovery mechanisms 330 may be independently provided by segment-creation apparatus 302, segment-management apparatus 308, messaging service 314, and/or query-processing apparatus 320, or a standalone failure-management apparatus 326 may use monitoring alerts 328 and/or auto-recovery mechanisms 330 to manage failures detected in other components of the system.

Figure 4:
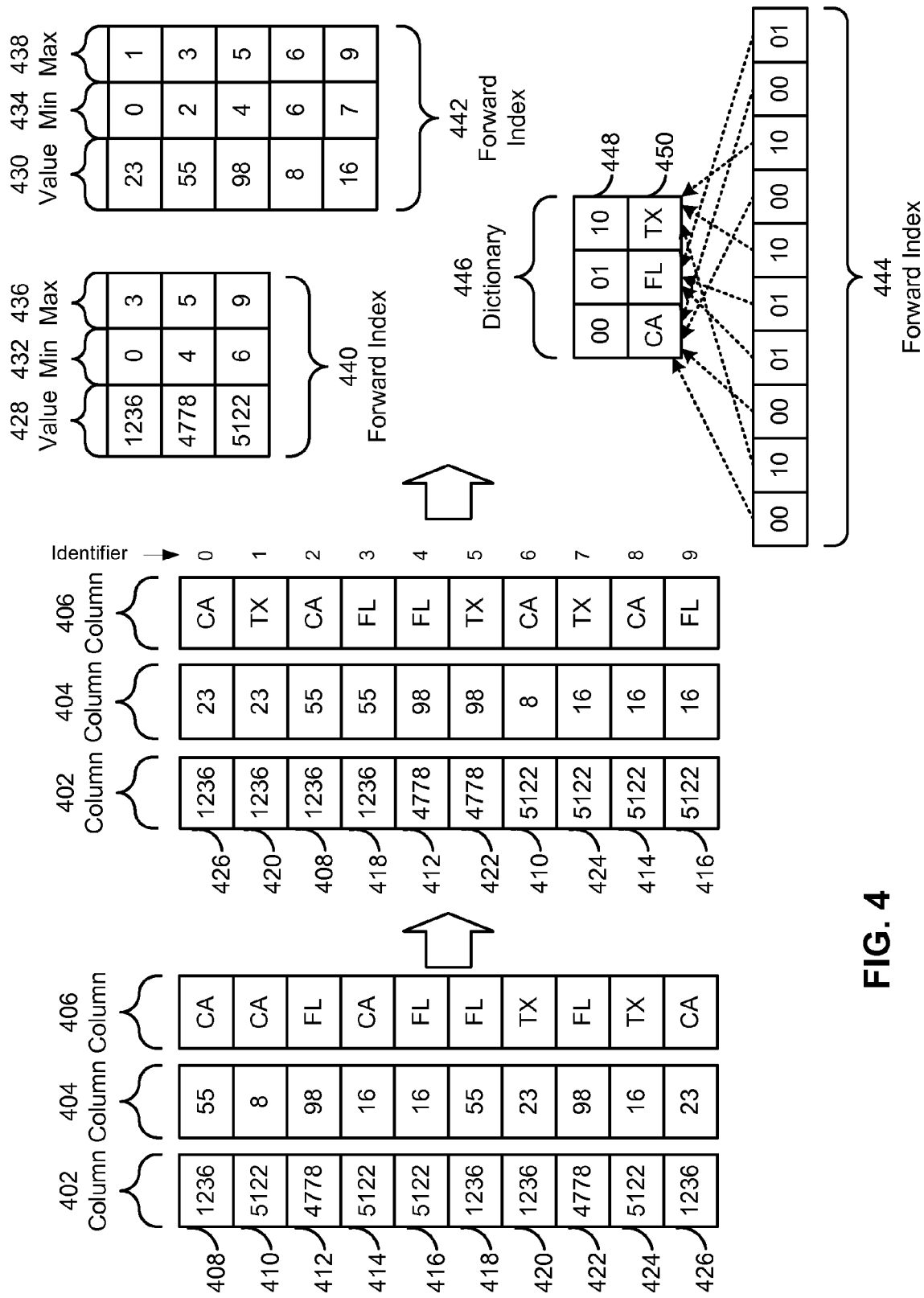
FIG. 4 shows the exemplary creation of a set of forward indexes in a data segment in accordance with the disclosed embodiments.

FIG. 4 shows the exemplary creation of a set of forward indexes 440-444 in a data segment in accordance with the disclosed embodiments. The data segment may be a real-time data segment that contains newly generated records of one or more metrics and/or dimensions, or the data segment may be an offline data segment that contains older records of the metric(s) and/or dimension(s).

As described above, forward indexes 440-444 may facilitate aggregation and/or compression of records 408-426 in the data segment. As shown in FIG. 4, records 408-426 are initially unsorted and include three columns 402-406. For example, records 408-426 may initially be ordered by time as records 408-426 are received in a data queue, such as data queue 202 of FIG. 2. In addition, column 402 may include identifiers for entities (e.g., users, organizations, etc.) associated with records 408-426, column 404 may include identifiers for objects (e.g., products, ads, services, accounts, etc.) associated with the entities, and column 406 may specify locations (e.g., states) associated with events represented by records 408-426.

Next, records 408-426 may be sorted by a primary sort column 402 and a secondary sort column 404. More specifically, records 408-426 may initially be sorted by values in the primary sort column 402. Records 408-426 may then be further sorted by values in the secondary sort column 404 for each value in the primary sort column 402. Such sorting may facilitate searching and/or compression of records 408-426 by values in primary sort column 402 and/or secondary sort column 404.

Moreover, records 408-428 and/or other records in the data queue may be sorted prior to dividing the records among different data segments to reduce the number of unique values in columns 402-406 and facilitate compression of the records in the data segments. For example, the sorting of 100 million records before splitting the records among 10 data segments may reduce the number of unique values in each set of records for a data segment, thus reducing the sizes of dictionaries for columns the data segment and increasing the amount of compression in the data segment.

Sorting and/or ordering of records within and/or among data segments may additionally be configured to optimize for querying and/or compression. For example, the records may be sorted by different columns and/or grouped into data segments of differing sizes to facilitate querying, aggregation, and/or compression of the records in the data segments as the values in the records change over time.

After records 408-426 have been sorted by both columns 402-404, records 408-426 may be ordered in the following way: record 426, record 420, record 408, record 418, record 412, record 422, record 410, record 424, record 414, and record 416. In addition, numeric record identifiers may be assigned to the sorted records 408-426 to facilitate aggregation of records with the same values in columns 402-404 under a range of record identifiers. For example, record identifiers 0 through 9 may be assigned to records 426, 420, 408, 418, 412, 422, 410, 424, 414, and 416, respectively.

Forward indexes 440-444 and a dictionary 446 for records 408-426 may then be created in the data segment. Forward index 440 may represent column 402, forward index 442 may represent column 404, and forward index 444 and dictionary 446 may represent column 406. Because column 402 is sorted, forward index 440 may store each unique value 428 encountered in column 402 and specify minimum 432 and maximum 436 record identifiers of records containing the value. Forward index 440 may thus include a value of 1236 with a minimum record identifier of 0 and a maximum record identifier of 3, a value of 4778 with a minimum of 4 and a maximum of 5, and a value of 5122 with a minimum of 6 and a maximum of 9. In turn, forward index 440 may facilitate queries associated with records containing the same value in column 402 and reduce the memory overhead of column 402 from a distinct value for each record to two record identifier values for each distinct value.

Forward index 442 may also store each unique value 430 encountered in column 404 and specify minimum 434 and maximum 438 record identifiers for records containing the value. During a query for a specific value 430 of a record in column 404, a binary search may be performed on forward index 442 to discover the range of record identifiers (e.g., minimum 434 and maximum 438) containing the record and value 430 for the record.

Finally, forward index 444 and dictionary 446 may be used to compress data in column 406, which is unsorted. In particular, dictionary 446 may map unique values 450 in column 406 to fixed-length encodings 448 of values 450. For example, dictionary 446 may use two bits to represent the three possible values in column 406: 00 may represent the "CA" value, 01 may represent the "FL" value, and 10 may represent the "TX" value. Forward index 444 may then store fixed-length encodings 448 for each record in the data segment instead of values 450 (e.g., strings) represented by fixed-length encodings 448, which occupy significantly more space. The value of column 406 for a given record may then be obtained by obtaining the bits representing the fixed-length encoding of the value in the record from forward index 444, then using dictionary 446 to identify the value represented by the fixed-length encoding.

Figure 5:
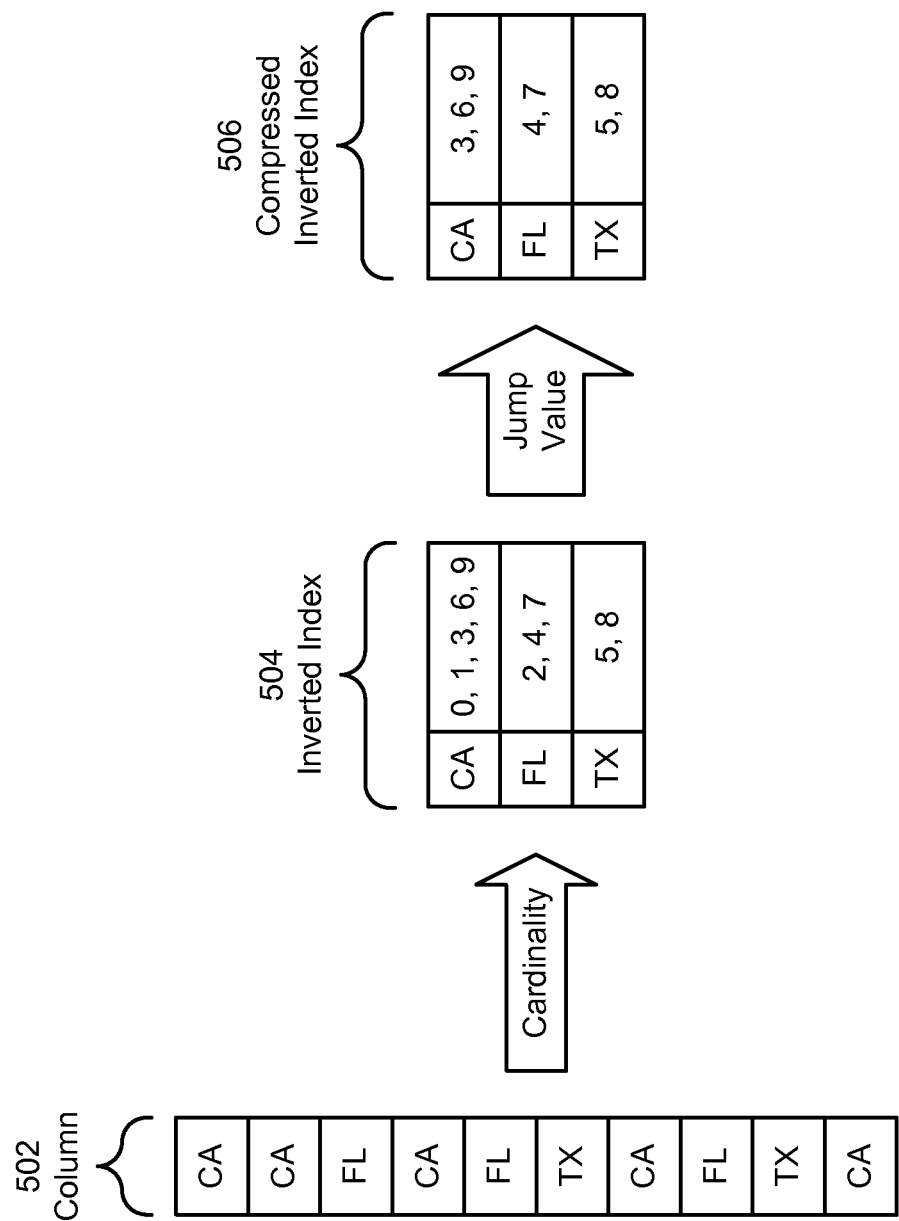
FIG. 5 shows the exemplary creation of an inverted index for a column in a data segment in accordance with the disclosed embodiments.

FIG. 5 shows the exemplary creation of an inverted index 504 for a column 502 in a data segment in accordance with the disclosed embodiments. The data segment may be a real-time data segment that contains newly generated records of one or more metrics and/or dimensions, or the data segment may be an offline data segment that contains older records of the metric(s) and/or dimension(s).

Inverted index 504 may facilitate querying of an unsorted column 502 by averting a linear search of the entire column 502 and/or forward index for column 502 in response to a Boolean and/or filtering query. For example, inverted index 504 may list the record identifiers of records containing each unique value (e.g., "CA," "FL," "TX") in column 502, thus increasing the speed of queries for records matching the value.

On the other hand, storing of inverted index 504 may require significant amounts of memory on top of memory occupied by the forward index. To balance the tradeoff between memory use and search time, inverted index 504 may be created based on a cardinality of column 502, which is associated with the ratio of the number of records to unique values in column 502. A low cardinality column may have a large number of records with the same value (e.g., greater than 100,000), a standard cardinality column may have a moderate number of records with the same value (e.g., between 100 and 100,000), and a high cardinality column may have a low number of records with the same value (e.g., less than 100).

First, inverted index 504 may be omitted if column 502 is associated with a low cardinality because inverted index 504 is likely to have high memory overhead and provide little to no acceleration of queries. Instead, queries on column 502 may be performed using the forward index for column 502.

Second, if column 502 is associated with a high cardinality, inverted index 504 may be created and stored using arrays in memory. As a result, inverted index 504 may consume significant amounts of memory but also provide significant acceleration of queries associated with column 502.

Figure 6:
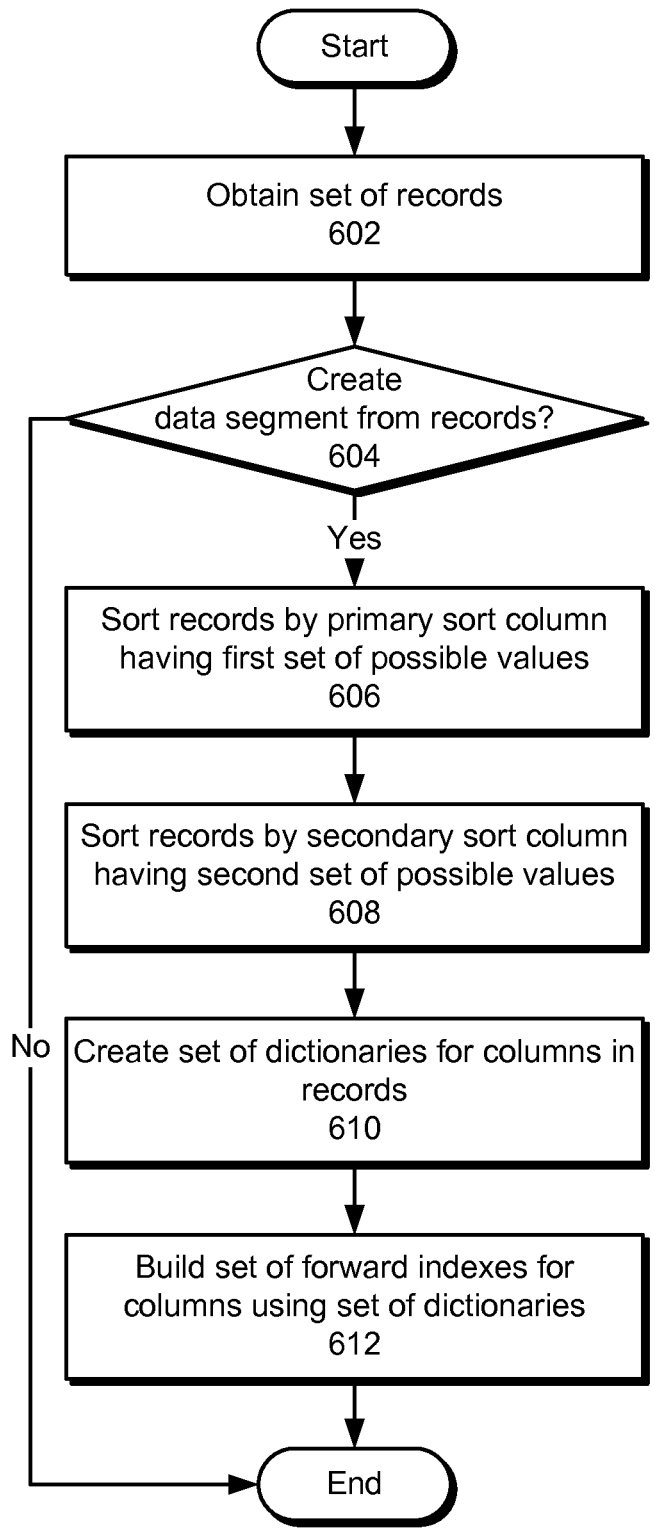
FIG. 6 shows a flowchart illustrating the processing of data in accordance with the disclosed embodiments.

If column 502 is associated with a standard cardinality, a compressed inverted index 506 may be used to balance memory consumption with query acceleration. As shown in FIG. 6, compressed inverted index 506 may be created by removing record identifiers from inverted index 504. In addition, the record identifiers may be removed based on a jump value associated with the record identifiers.

In particular, the jump value may represent a "jump" between consecutive record identifiers in a given entry in inverted index 504. When applying a particular jump value, a record identifier in an entry of inverted index 504 may be included in compressed inverted index 506 only if the difference between the record identifier and a consecutive record identifier in the same entry of inverted index 504 is equal to or greater than the jump value. For example, a jump value of 3 may cause record identifiers of 0, 1, and 2 to be removed from inverted index 504 during creation of compressed inverted index 506.

The jump value may be determined based on a threshold associated with compressing inverted index 504. For example, the threshold may specify the proportion of record identifiers to be included in compressed inverted index 506. The jump value may then be selected so that the specified proportion of record identifiers remains in compressed inverted index 506 after record identifiers that do not conform to the jump value are removed. Compressed inverted index 506 may then be further compressed using PForDelta and/or another compression technique.

After compressed inverted index 506 is created, querying of column 502 may be enabled using compressed inverted index 506 and a forward index of column 502. In particular, querying of column 502 may be performed by alternating between compressed inverted index 506 and the forward index to obtain all record identifiers associated with a given value. For example, a subset of record identifiers of records containing the "CA" value may be obtained from compressed inverted index 506, and the remainder of the record identifiers may be obtained by scanning portions of the forward index outside the jumps represented by consecutive record identifiers in compressed inverted index 506.

FIG. 6 shows a flowchart illustrating the processing of data in accordance with the disclosed embodiments. More specifically, FIG. 6 shows a flowchart illustrating the creation of forward indexes for data segments in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a set of records is obtained (operation 602). Each record may include one or more metrics and at least one dimension associated with the metric(s). Next, a data segment may be created from the records (operation 604). For example, a real-time data segment may be created from newly generated records once a buffer containing the records reaches a threshold size. Alternatively, or in addition to creation of a real-time data segment, an offline data segment may be periodically created from older records using batch processing. As a result, the data segment may not be created if the threshold size has not been reached by the buffer and/or batch processing of the records is not scheduled to occur. Instead, creation of the data segment may be delayed until constraints associated with creation of the data segment have been satisfied.

If the data segment is to be created, the records are sorted by a primary sort column having a first set of possible values (operation 606), then by a secondary sort column having a second set of possible values (operation 608). For example, the records may be sorted by the primary sort column to create contiguous regions of records with the same value in the primary sort column. The records may then be sorted by the second set of possible values within each contiguous region associated with a value from the first set of possible values.

Next, a set of dictionaries is created for the columns in the records (operation 610), and a set of forward indexes is built for the columns using the set of dictionaries (operation 612). First, a dictionary may be created for each column in the records. Next, forward indexes for the primary and secondary sort columns may be built by storing a range of record identifiers for each value from the first and second sets of possible values. Finally, a forward index may be built for each unsorted column in the records by storing a fixed-length encoding of values in the unsorted column.

Figure 7:
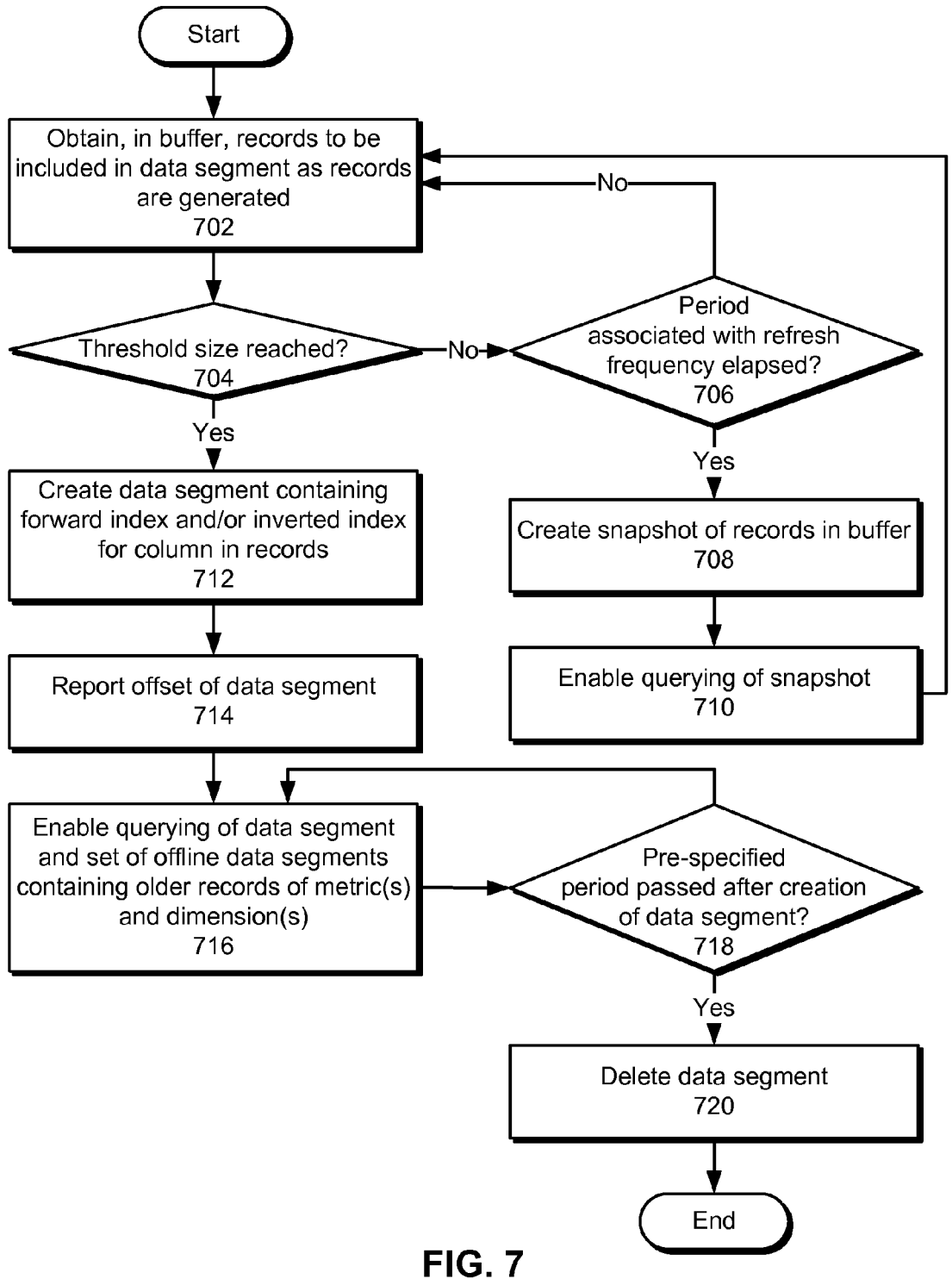
FIG. 7 shows a flowchart illustrating the processing of data in accordance with the disclosed embodiments.

FIG. 7 shows a flowchart illustrating the processing of data in accordance with the disclosed embodiments. More specifically, FIG. 7 shows a flowchart illustrating the real-time indexing of data in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, records to be included in a data segment are obtained in a buffer as the records are generated (operation 702). The records may include one or more metrics and one or more dimensions. As the buffer fills, the buffer may reach a threshold size (operation 704). For example, the buffer may reach the threshold after the buffer contains a pre-specified number of records.

If the threshold size is reached, a data segment containing a forward index and/or an inverted index for a column in the records is created (operation 712), and an offset of the data segment is reported (operation 714). Querying of the data segment and a set of offline data segments containing older records of the metric(s) and dimension(s) is also enabled (operation 716). In addition, the offline data segments may periodically be created independently of creation of the data segment.

Prior to generation of the data segment (e.g., before the threshold size is reached), a period associated with a refresh frequency may elapse (operation 706). The refresh frequency may be set to facilitate timely querying of the records. If the period has elapsed, a snapshot of records in the buffer is created (operation 708), and querying of the snapshot is enabled (operation 710). Records may also continue to be obtained in the buffer (operation 702) before the threshold size is reached. The data segment and/or snapshots of the records may then be created according to the threshold size and refresh frequency, respectively, and the buffer may be emptied after the data segment is created.

A pre-specified period may also pass after the creation of the data segment (operation 718). If the pre-specified period has not passed, querying of the data segment along with the offline data segments may continue to be enabled (operation 716). Once the pre-specified period has passed, the data segment is deleted (operation 720). For example, the data segment may be deleted after an offline data segment containing the same records is created to reduce memory consumption associated with the records.

Figure 8:
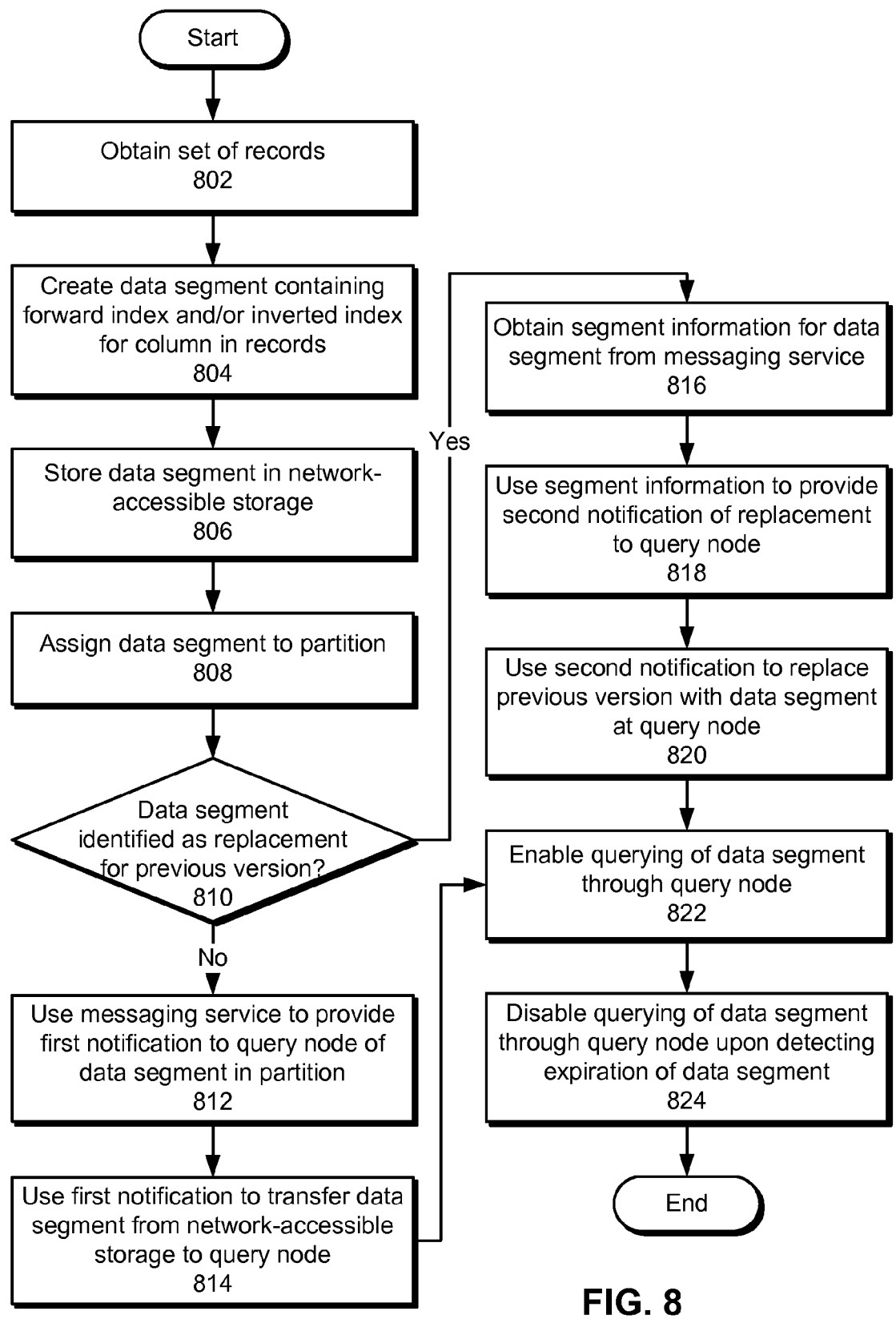
FIG. 8 shows a flowchart illustrating the processing of data in accordance with the disclosed embodiments.

FIG. 8 shows a flowchart illustrating the processing of data in accordance with the disclosed embodiments. More specifically, FIG. 8 shows a flowchart illustrating the management of data segments for analytics queries in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

First, a set of records is obtained (operation 802). Next, a data segment containing a forward index and/or inverted index for a column in the records is created (operation 804) and stored in network-accessible storage (operation 806). The data segment is also assigned to a partition (operation 808). For example, the data segment may be assigned to the partition based on a hash value calculated from an identifier for the data segment and the number of partitions to which the data segment can be assigned.

The data segment may be identified as a replacement for a previous version (operation 810) of the data segment. If the data segment is not identified as a replacement for the previous version, a messaging service is used to provide a first notification to a query node associated with the partition of the data segment in the partition (operation 812). For example, the notification may include identifiers for the data segment and partition and a path and/or URL to the data segment in the network-accessible storage. The first notification may then be used to transfer the data segment from the network-accessible storage to the query node (operation 814).

If the data segment is identified as a replacement for the previous version, segment information for the data segment is obtained from the messaging service (operation 816) and used to provide a second notification of the replacement to the query node (operation 818). For example, the second notification may be used to override a first, earlier notification of the previous version of the data segment at the messaging service. The second notification is then used to replace the previous version with the data segment at the query node (operation 820).

Once the data segment is obtained at the query node, querying of the data segment is enabled through the query node (operation 822). Finally, querying of the data segment through the query node is disabled upon detecting an expiration of the data segment (operation 824). For example, the data segment may be deleted from the query node after a TTL of the data segment has elapsed.

Figure 9:
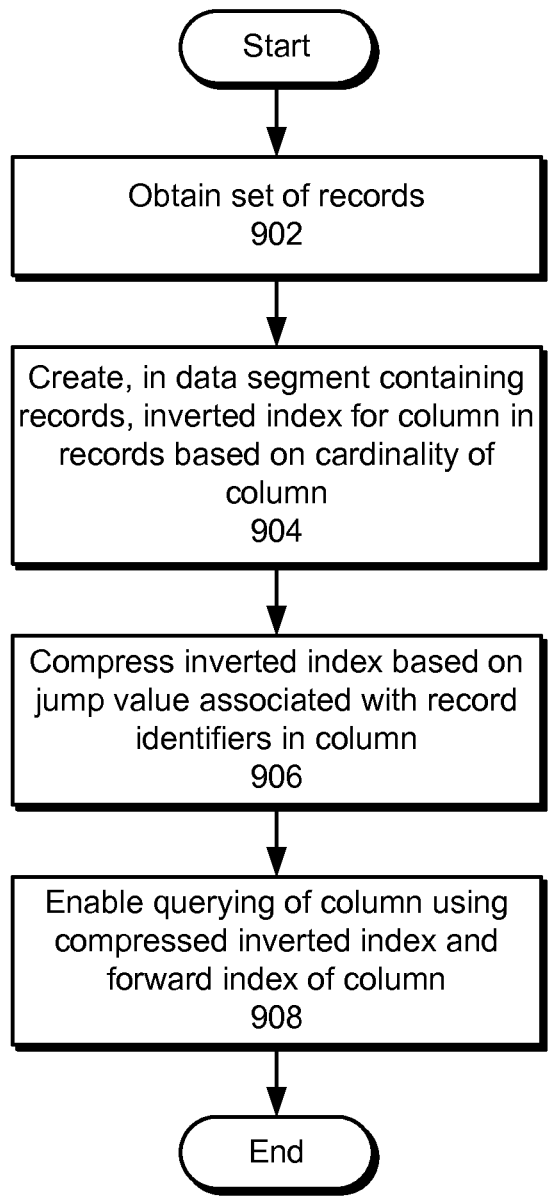
FIG. 9 shows a flowchart illustrating the processing of data in accordance with the disclosed embodiments.

FIG. 9 shows a flowchart illustrating the processing of data in accordance with the disclosed embodiments. More specifically, FIG. 9 shows a flowchart illustrating the creation of inverted indexes for data segments in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

Initially, a set of records is obtained (operation 902). Next, a data segment containing an inverted index for a column in the records is optionally created based on a cardinality of the column (operation 904). The inverted index may be created if the column is associated with a standard or high cardinality and omitted if the column is associated with a low cardinality.

The inverted index is then optionally compressed based on a jump value associated with record identifiers in the column (operation 906). For example, the inverted index may be compressed if the column is associated with a standard cardinality and remain uncompressed if the column is associated with a high cardinality.

The jump value may be determined based on a threshold associated with compressing the inverted index. For example, the threshold may specify a proportion of the record identifiers to be included in the compressed inverted index, and the jump value may be selected to maintain the proportion in the compressed inverted index. A record identifier may then be included in the compressed inverted index if the difference between the record identifier and a consecutive record identifier in the same entry of the inverted index is greater than the jump value.

Finally, querying of the column using the compressed inverted index and a forward index of the column is enabled (operation 908). During querying of the column, record identifiers matching a value in the column may be obtained by alternating between the compressed inverted index and the forward index. As a result, the compressed inverted index may balance the tradeoff between memory consumption and query acceleration in inverted indexes.

Figure 10:
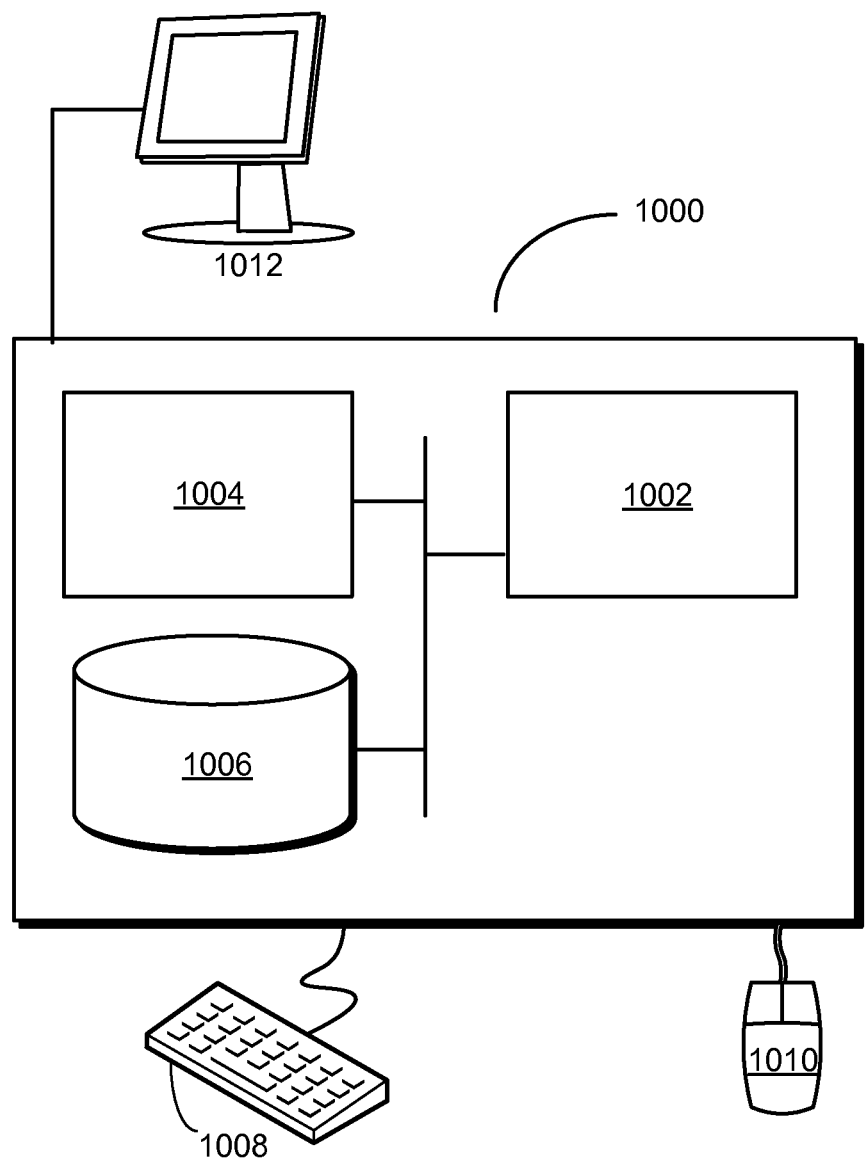
FIG. 10 shows a computer system in accordance with the disclosed embodiments.

FIG. 10 shows a computer system 1000 in accordance with the disclosed embodiments. Computer system 1000 includes a processor 1002, memory 1004, storage 1006, and/or other components found in electronic computing devices. Processor 1002 may support parallel processing and/or multi-threaded operation with other processors in computer system 1000. Computer system 1000 may also include input/output (I/O) devices such as a keyboard 1008, a mouse 1010, and a display 1012.

Computer system 1000 may include functionality to execute various components of the disclosed embodiments. In particular, computer system 1000 may include an operating system (not shown) that coordinates the use of hardware and software resources on computer system 1000, as well as one or more applications that perform specialized tasks for the user. To perform tasks for the user, applications may obtain the use of hardware resources on computer system 1000 from the operating system, as well as interact with the user through a hardware and/or software framework provided by the operating system.

In one or more embodiments, computer system 1000 provides a system for processing data. The system may include a data queue that provides a set of records. Each record may include one or more metrics and at least one dimensions associated with the metric(s). For example, the record may include attributes and/or values associated with an event and/or a user participating in the event.

The system may also include one or more segment-creation apparatuses that create data segments from the records. In particular, the system may include a first segment-creation apparatus that obtains, in a buffer, records to be included in a data segment as the records are generated. After the buffer reaches a threshold size, the first segment-creation apparatus may create the data segment from the records. Prior to creating the data segment, the first segment-creation apparatus may periodically create a snapshot of the records in the buffer and enable querying of the snapshot to facilitate real-time analytics of the records.

The system may also include a second segment-creation apparatus that periodically creates the offline data segments from the older records independently of the creation of real-time data segments in the first segment-creation apparatus. To enable querying of the offline data segments, a segment-management apparatus may store the segment in network-accessible storage and assign the data segment to a partition. A messaging service may provide a notification of the data segment in the partition, and a query node associated with the partition may use the notification to transfer the data segment from the network-accessible storage to the query node, thereby enabling querying of the data segment through the query node.

During creation of the data segments, the segment-creation apparatuses may include a set of forward indexes and/or one or more inverted indexes in the data segments. In particular, the segment-creation apparatuses may sort the records by a primary sort column having a first set of possible values and/or a secondary sort column having a second set of possible values. Next, the segment-creation apparatuses may create a set of dictionaries for a set of columns in the records. Finally, the segment-creation apparatuses may build a set of forward indexes for the columns using the set of dictionaries. Similarly, the segment-creation apparatuses may create an inverted index for a column in a data segment based on a cardinality of the column and compress the inverted index based on a jump value associated with record identifiers in the column. A query-processing apparatus may then enable querying of the compressed inverted index and a forward index of the column by alternating between the compressed inverted index and the forward index during processing of a query.

Finally, the system may include a query-management apparatus that enables querying of the real-time data segments, offline data segments, and/or snapshots. For example, the query-management apparatus may perform a query with the offline data segments up to the latest time associated with available records in the offline data segments and perform the query with the real-time data segments and/or snapshots for records occurring after the latest time.

In addition, one or more components of computer system 1000 may be remotely located and connected to the other components over a network. Portions of the present embodiments (e.g., data queue, segment-creation apparatus, segment-management apparatus, messaging service, query-processing apparatus, query node, query-management apparatus, etc.) may also be located on different nodes of a distributed system that implements the embodiments. For example, the present embodiments may be implemented using a cloud computing system that supports compression and timely querying of large data sets by a set of remote users and/or electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
    obtaining a set of records, wherein each of the records comprises one or more metrics and at least one dimension associated with the one or more metrics;
    sorting the records by values in a primary sort column of the records;
    creating a data segment comprising at least one of a forward index and an inverted index for a column in the sorted records;
    storing the data segment in network-accessible storage;
    assigning the data segment to a partition;
    enabling querying of the data segment through a query node associated with the partition; and
    upon identifying the data segment as a replacement for a previous version of the data segment in the partition,
        obtaining segment information for the data segment;
        based on the segment information notifying the query node of the replacement, thereby enabling the query node to replace the previous version of the data segment with the data segment.

2. The computer-implemented method of claim 1, further comprising:
    disabling querying of the data segment through the query node upon detecting an expiration of the data segment.

3. The computer-implemented method of claim 1, further comprising:
    using a messaging service to provide a first notification to the query node of the data segment in the partition; and
    using the first notification to transfer the data segment from the network-accessible storage to the query node.

4. The computer-implemented method of claim 3, further comprising:
    upon detecting a failure associated with an availability of the data segment for querying through the query node, managing the failure using at least one of a monitoring alert and an auto-recovery mechanism.

5. The computer-implemented method of claim 4, wherein the failure is associated with at least one of:
    obtaining the data segment;
    storing the data segment;
    communication with the messaging service; and
    transfer of the data segment to the query node.

6. The computer-implemented method of claim 1,
    wherein the segment information is obtained from a messaging service that provides notifications to the query node; and
    wherein the messaging service is used notify the query node of the replacement.

7. The computer-implemented method of claim 6, wherein the previous version of the data segment is associated with at least one of data corruption and data loss.

8. The computer-implemented method of claim 1, wherein the set of records in the data segment is obtained over a pre-specified period of time.

9. A system for processing data, comprising:
    a data queue configured to provide a set of records, wherein each of the records comprises one or more metrics and at least one dimension associated with the one or more metrics;
    a segment-creation apparatus configured to:
        sort the records by values in a primary sort column of the records; and
        create a data segment comprising at least one of a forward index and an inverted index for a column in the sorted records;
    a segment-management apparatus configured to:
        store the data segment in network-accessible storage; and
        assign the data segment to a partition; and
        wherein upon identifying the data segment as a replacement for a previous version of the data segment in the partition, the segment-management apparatus is further configured to,
            obtain segment information for the data segment from the messaging service, and
            based on the segment information, provide a notification of the replacement to a query node associated with the partition,
        wherein the notification of the replacement enables the query node to replace the previous version of the data segment with the data segment.

10. The system of claim 9, wherein the segment-management apparatus is further configured to:
    disable querying of the data segment through the query node upon detecting an expiration of the data segment.

11. The system of claim 9, further comprising:
    a messaging service configured to provide a first notification to the query node of the data segment in the partition; and
    wherein the query node is further configured to use the first notification to transfer the data segment from the network-accessible storage to the query node.

12. The system of claim 9, wherein the querying node is configured to enable querying of the data segment using the forward index or the inverted index.

13. The system of claim 12, wherein the previous version of the data segment is associated with at least one of data corruption and data loss.

14. The system of claim 9, further comprising:
    a failure-management apparatus configured to:
        detect a failure associated with an availability of the data segment for querying through the query node; and
        manage the failure using at least one of a monitoring alert and an auto-recovery mechanism.

15. A non-transitory computer-readable storage medium storing instructions that when executed by a computer cause the computer to perform a method for processing data, the method comprising:
    obtaining a set of records, wherein each of the records comprises one or more metrics and at least one dimension associated with the one or more metrics;
    sorting the records by values in a primary sort column of the records;
    creating a data segment comprising at least one of a forward index and an inverted index for a column in the sorted records;
    storing the data segment in network-accessible storage;
    assigning the data segment to a partition;
    enabling querying of the data segment through a query node associated with the partition; and
    upon identifying the data segment as a replacement for a previous version of the data segment in the partition,
        obtaining segment information for the data segment;
        based on the segment information notifying the query node of the replacement, thereby enabling the query node to replace the previous version of the data segment with the data segment.

16. The non-transitory computer-readable storage medium of claim 15, the method further comprising:
    disabling querying of the data segment through the query node upon detecting an expiration of the data segment.

17. The non-transitory computer-readable storage medium of claim 15, the method further comprising:
    using a messaging service to provide a first notification to the query node of the data segment in the partition; and
    using the first notification to transfer the data segment from the network-accessible storage to the query node.

18. The non-transitory computer-readable storage medium of claim 17, the method further comprising:
    upon detecting a failure associated with an availability of the data segment for querying through the query node, managing the failure using at least one of a monitoring alert and an auto-recovery mechanism.

19. The non-transitory computer-readable storage medium of claim 18, wherein the failure is associated with at least one of:
    obtaining the data segment;
    storing the data segment;
    communication with the messaging service; and
    transfer of the data segment to the query node.

20. The non-transitory computer-readable storage medium of claim 15,
    wherein the segment information is obtained from a messaging service that provides notifications to the query node; and
    wherein the messaging service is used notify the query node of the replacement.

\* \* \* \* \*